(12) United States Patent
Mischler et al.

(10) Patent No.: US 9,822,694 B2
(45) Date of Patent: Nov. 21, 2017

(54) METHODS AND SYSTEM FOR CONTROLLING SURGE IN A TWO-STAGE TURBOCHARGER

(75) Inventors: James Robert Mischler, Lawrence Park, PA (US); Daniel Edward Loringer, Lawrence Park, PA (US); Neil Xavier Blythe, Lawrence Park, PA (US); Luke Henry, Lawrence Park, PA (US); Matthew John Malone, Lawrence Park, PA (US); Greg Thomas Polkus, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 856 days.

(21) Appl. No.: 13/570,462

(22) Filed: Aug. 9, 2012

(65) Prior Publication Data

US 2014/0041384 A1 Feb. 13, 2014

(51) Int. Cl.

| F02D 41/00 | (2006.01) |
|---|---|
| F02D 23/00 | (2006.01) |
| F02B 37/013 | (2006.01) |
| F02M 26/43 | (2016.01) |
| F02M 26/08 | (2016.01) |
| F02B 29/04 | (2006.01) |
| F02B 37/18 | (2006.01) |
| F02B 37/12 | (2006.01) |
| F02M 26/28 | (2016.01) |

(52) U.S. Cl.
CPC ........... *F02B 37/013* (2013.01); *F02D 23/00* (2013.01); *F02D 41/0007* (2013.01); *F02D 41/0052* (2013.01); *F02M 26/08* (2016.02); *F02M 26/43* (2016.02); *F02B 29/0412* (2013.01); *F02B 37/127* (2013.01); *F02B 37/18* (2013.01); *F02M 26/28* (2016.02); *Y02T 10/144* (2013.01); *Y02T 10/47* (2013.01)

(58) Field of Classification Search
CPC ...... F02B 37/013; F02B 37/18; F02B 37/004; F02B 37/22; F02B 37/183; F02B 37/127; F02B 29/0412; F02B 37/12; Y02T 10/144; F02D 41/0007; F02D 23/00; F02D 2250/21; F02M 25/0711; F02M 26/08; F02M 26/43
USPC ........... 60/612, 602, 605.1, 611, 601, 605.2; 123/562, 564; 701/108
See application file for complete search history.

(56) References Cited

U.S. PATENT DOCUMENTS

| 7,958,730 | B2 * | 6/2011 | Stewart | 60/612 |
|---|---|---|---|---|
| 8,033,108 | B2 * | 10/2011 | Ishikawa et al. | 60/602 |
| 8,191,369 | B2 | 6/2012 | Geyer et al. | |
| 8,522,551 | B2 * | 9/2013 | Tomita et al. | 60/612 |
| 2006/0021347 | A1 * | 2/2006 | Sun et al. | 60/612 |
| 2006/0070381 | A1 * | 4/2006 | Parlow et al. | 60/612 |
| 2009/0077968 | A1 * | 3/2009 | Sun | 60/605.2 |
| 2009/0293477 | A1 * | 12/2009 | Shu et al. | 60/602 |

* cited by examiner

*Primary Examiner* — Hoang Nguyen (74) *Attorney, Agent, or Firm* — Global Patent Operation; John A. Kramer (57) ABSTRACT

Various methods and systems are provided for controlling air flow in a two-stage turbocharger. In one example, an engine method comprises adjusting one or more exhaust gas recirculation valves to maintain a first turbocharger within a first air flow range, and adjusting a turbocharger bypass valve to maintain a second turbocharger within a second air flow range.

23 Claims, 4 Drawing Sheets

METHODS AND SYSTEM FOR CONTROLLING SURGE IN A TWO-STAGE TURBOCHARGER

FIELD

Embodiments of the subject matter disclosed herein relate to an engine, engine components, and an engine system, for example.

BACKGROUND

Exhaust gas recirculation (EGR) may reduce NOx emissions produced in diesel engines. The application of EGR requires high levels of boost provided by a turbocharger, and, in engines configured to operate with highly variable exhaust gas recirculation rates, a wide turbocharger operating map. Such demands may be provided by a two-stage turbocharger. However, the inclusion of two stages increases the complexity of maintaining the turbocharger within its surge and choke limits, particularly during transient operating events.

BRIEF DESCRIPTION

In one embodiment, an engine method comprises adjusting one or more exhaust gas recirculation valves to maintain a first turbocharger within a first air flow range, and adjusting a turbocharger bypass valve to maintain a second turbocharger within a second air flow range.

In this way, each turbocharger may be maintained within respective air flow ranges for avoiding surge and choke. In one example, the first turbocharger and the second turbocharger may respond differently to differing engine operating parameters, such as air flow changes due to transient changes in load, and thus each turbocharger may be adjusted differentially via a turbocharger bypass valve or via an exhaust gas recirculation valve.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments of regulating air flow through a two-stage turbocharger. Turbochargers are operated between a lower limit air flow below which surge occurs and an upper limit air flow above which choke occurs. However, in engines with highly variable exhaust gas recirculation (EGR) rates, air flow fluctuations may occur in response to changes in EGR, resulting in surge or choke under some conditions. To ensure air flow and pressure fluctuations do not cause turbocharger surge or choke, air flow through a high-pressure stage of the turbocharger may be controlled via a turbine bypass valve. Additionally, engine EGR rates may be controlled to provide desired intake oxygen, and under select conditions, the EGR rates may be controlled to avoid surge in a low-pressure stage of the turbocharger. The select conditions may include a decrease in engine load, and/or opening of the turbine bypass valve, both of which may result in decreased air flow through the low-pressure turbocharger.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include mining equipment, marine vessels, on-road transportation vehicles, off-highway vehicles (OHV), and rail vehicles. For clarity of illustration, a locomotive is provided as an example of a mobile platform supporting a system incorporating an embodiment of the invention.

Figure 1:
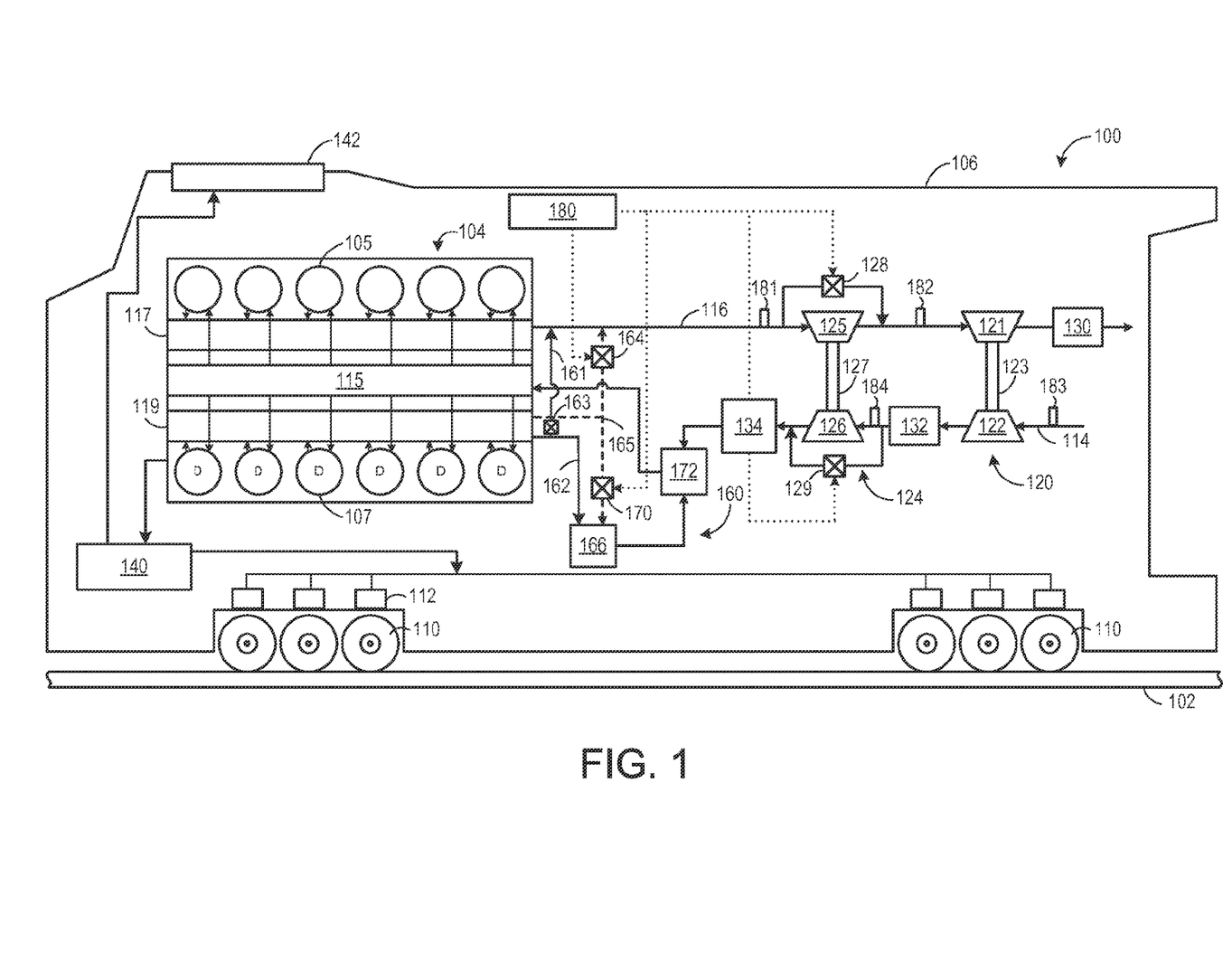
FIG. 1 shows a schematic diagram of a rail vehicle with an engine according to an embodiment of the invention.

Before further discussion of the approach for avoiding turbocharger surge during transients, an example of a platform is disclosed in which the engine system may be installed in a vehicle, such as a rail vehicle. For example, FIG. 1 shows a block diagram of an embodiment of a vehicle system 100 (e.g., a locomotive system), herein depicted as a rail vehicle 106, configured to run on a rail 102 via a plurality of wheels 110. As depicted, the rail vehicle 106 includes an engine 104. In other non-limiting embodiments, the engine 104 may be a stationary engine, such as in a power-plant application, or an engine in a marine vessel or off-highway vehicle propulsion system as noted above.

The engine 104 receives intake air for combustion from an intake, such as an intake manifold 115. The intake may be any suitable conduit or conduits through which gases flow to enter the engine. For example, the intake may include the intake manifold 115, the intake passage 114, and the like. The intake passage 114 receives ambient air from an air filter (not shown) that filters air from outside of a vehicle in which the engine 104 may be positioned. Exhaust gas resulting from combustion in the engine 104 is supplied to an exhaust, such as exhaust passage 116. The exhaust may be any suitable conduit through which gases flow from the engine. For example, the exhaust may include an exhaust manifold 117, the exhaust passage 116, and the like. Exhaust gas flows through the exhaust passage 116, and out of an exhaust stack of the rail vehicle 106. In one example, the engine 104 is a diesel engine that combusts air and diesel fuel through compression ignition. In other non-limiting embodiments, the engine 104 may combust fuel including gasoline, kerosene, biodiesel, or other petroleum distillates of similar density through compression ignition (and/or spark ignition).

In one embodiment, the rail vehicle 106 is a diesel-electric vehicle. As depicted in FIG. 1, the engine 104 is coupled to an electric power generation system, which includes an alternator/generator 140 and electric traction motors 112. For example, the engine 104 is a diesel engine that generates a torque output that is transmitted to the alternator/generator 140 which is mechanically coupled to the engine 104. The alternator/generator 140 produces electrical power that may be stored and applied for subsequent propagation to a variety of downstream electrical components. As an example, the alternator/generator 140 may be electrically coupled to a plurality of traction motors 112 and the generator 140 may provide electrical power to the plurality of traction motors 112. As depicted, the plurality of traction motors 112 are each connected to one of a plurality of wheels 110 to provide tractive power to propel the rail vehicle 106. One example configuration includes one traction motor per wheel. As depicted herein, six pairs of traction motors correspond to each of six pairs of wheels of the rail vehicle. In another example, alternator/generator 140 may be coupled to one or more resistive grids 142. The resistive grids 142 may be configured to dissipate excess engine torque via heat produced by the grids from electricity generated by alternator/generator 140.

In the embodiment depicted in FIG. 1, the engine 104 is a V-12 engine having twelve cylinders. In other examples, the engine may be a V-6, V-8, V-10, V-16, I-4, I-6, I-8, opposed 4, or another engine type. As depicted, the engine 104 includes a subset of non-donor cylinders 105, which includes six cylinders that supply exhaust gas exclusively to a non-donor cylinder exhaust manifold 117, and a subset of donor cylinders 107, which includes six cylinders that supply exhaust gas exclusively to a donor cylinder exhaust manifold 119. In other embodiments, the engine may include at least one donor cylinder and at least one non-donor cylinder. For example, the engine may have four donor cylinders and eight non-donor cylinders, or three donor cylinders and nine non-donor cylinders. It should be understood, the engine may have any desired numbers of donor cylinders and non-donor cylinders, with the number of donor cylinders typically lower than the number of non-donor cylinders.

As depicted in FIG. 1, the non-donor cylinders 105 are coupled to the exhaust passage 116 to route exhaust gas from the engine to atmosphere (after it passes through an exhaust gas treatment system 130 and first and second turbochargers 120 and 124). The donor cylinders 107, which provide engine exhaust gas recirculation (EGR), are coupled exclusively to an EGR passage 162 of an EGR system 160 which routes exhaust gas from the donor cylinders 107 to the intake passage 114 of the engine 104, and not to atmosphere. By introducing cooled exhaust gas to the engine 104, the amount of available oxygen for combustion is decreased, thereby reducing combustion flame temperatures and reducing the formation of nitrogen oxides (e.g., $NO_x$).

Exhaust gas flowing from the donor cylinders 107 to the intake passage 114 passes through a heat exchanger such as an EGR cooler 166 to reduce a temperature of (e.g., cool) the exhaust gas before the exhaust gas returns to the intake passage. The EGR cooler 166 may be an air-to-liquid heat exchanger, for example. In such an example, one or more charge air coolers 132 and 134 disposed in the intake passage 114 (e.g., upstream of where the recirculated exhaust gas enters) may be adjusted to further increase cooling of the charge air such that a mixture temperature of charge air and exhaust gas is maintained at a desired temperature. In other examples, the EGR system 160 may include an EGR cooler bypass. Alternatively, the EGR system may include an EGR cooler control element. The EGR cooler control element may be actuated such that the flow of exhaust gas through the EGR cooler is reduced; however, in such a configuration, exhaust gas that does not flow through the EGR cooler is directed to the exhaust passage 116 rather than the intake passage 114.

Additionally, in some embodiments, the EGR system 160 may include an EGR bypass passage 161 that is configured to divert exhaust from the donor cylinders back to the exhaust passage. The EGR bypass passage 161 may be controlled via a valve 163. The valve 163 may be configured with a plurality of restriction points such that a variable amount of exhaust is routed to the exhaust, in order to provide a variable amount of EGR to the intake.

In an alternate embodiment shown in FIG. 1, the donor cylinders 107 may be coupled to an alternate EGR passage 165 (illustrated by the dashed lines) that is configured to selectively route exhaust to the intake or to the exhaust passage. For example, when a second valve 170 is open, exhaust may be routed from the donor cylinders to the EGR cooler 166 and/or additional elements prior to being routed to the intake passage 114.

Further, the alternate EGR system includes a first valve 164 disposed between the exhaust passage 116 and the alternate EGR passage 165. The second valve 170 may be an on/off valve controlled by the control unit 180 (for turning the flow of EGR on or off), or it may control a variable amount of EGR, for example. In some examples, the first valve 164 may be actuated such that an EGR amount is reduced (exhaust gas flows from the EGR passage 165 to the exhaust passage 116). In other examples, the first valve 164 may be actuated such that the EGR amount is increased (e.g., exhaust gas flows from the exhaust passage 116 to the EGR passage 165). In some embodiments, the alternate EGR system may include a plurality of EGR valves or other flow control elements to control the amount of EGR.

In such a configuration, the first valve 164 is operable to route exhaust from the donor cylinders to the exhaust passage 116 of the engine 104 and the second valve 170 is operable to route exhaust from the donor cylinders to the intake passage 114 of the engine 104. As such, the first valve 164 may be referred to as an EGR bypass valve, while the second valve 170 may be referred to as an EGR metering valve. In the embodiment shown in FIG. 1, the first valve 164 and the second valve 170 may be engine oil, or hydraulically, actuated valves, for example, with a shuttle valve (not shown) to modulate the engine oil. In some examples, the valves may be actuated such that one of the first and second valves 164 and 170 is normally open and the other is normally closed. In other examples, the first and second valves 164 and 170 may be pneumatic valves, electric valves, or another suitable valve.

Note the term "valve" refers to a device that is controllable to selectively fully open, fully close, or partially open a passage to control gas flow through the passage. Moreover, the valve may be controllable to any position between open and closed to vary gas flow to a commanded gas flow. It is to be understood that valve is merely one example of a control device and any suitable control element may be employed to control gas flow without departing from the scope of this disclosure.

As shown in FIG. 1, the vehicle system 100 further includes an EGR mixer 172 which mixes the recirculated exhaust gas with charge air such that the exhaust gas may be evenly distributed within the charge air and exhaust gas mixture. In the embodiment depicted in FIG. 1, the EGR system 160 is a high-pressure EGR system which routes exhaust gas from a location upstream of turbochargers 120 and 124 in the exhaust passage 116 to a location downstream of turbochargers 120 and 124 in the intake passage 114. In other embodiments, the vehicle system 100 may additionally or alternatively include a low-pressure EGR system which routes exhaust gas from downstream of the turbochargers 120 and 124 in the exhaust passage 116 to a location upstream of the turbochargers 120 and 124 in the intake passage 114.

As depicted in FIG. 1, the vehicle system 100 further includes a two-stage turbocharger with the first turbocharger 120 and the second turbocharger 124 arranged in series, each of the turbochargers 120 and 124 arranged between the intake passage 114 and the exhaust passage 116. The two-stage turbocharger increases air charge of ambient air drawn into the intake passage 114 in order to provide greater charge density during combustion to increase power output and/or engine-operating efficiency. The first turbocharger 120 operates at a relatively lower pressure, and includes a first turbine 121 which drives a first compressor 122. The first turbine 121 and the first compressor 122 are mechanically coupled via a first shaft 123. The first turbocharger may be referred to the "low-pressure stage" of the turbocharger. The second turbocharger 124 operates at a relatively higher pressure, and includes a second turbine 125 which drives a second compressor 126. The second turbocharger may be referred to the "high-pressure stage" of the turbocharger. The second turbine and the second compressor are mechanically coupled via a second shaft 127.

As explained above, the terms "high pressure" and "low pressure" are relative, meaning that "high" pressure is a pressure higher than a "low" pressure. Conversely, a "low" pressure is a pressure lower than a "high" pressure.

As used herein, "two-stage turbocharger" may generally refer to a multi-stage turbocharger configuration that includes two or more turbochargers. For example, a two-stage turbocharger may include a high-pressure turbocharger and a low-pressure turbocharger arranged in series, three turbocharger arranged in series, two low pressure turbochargers feeding a high pressure turbocharger, one low pressure turbocharger feeding two high pressure turbochargers, etc. In one example, three turbochargers are used in series. In another example, only two turbochargers are used in series.

In the embodiment shown in FIG. 1, the second turbocharger 124 is provided with a turbine bypass valve 128 which allows exhaust gas to bypass the second turbocharger 124. The turbine bypass valve 128 may be opened, for example, to divert the exhaust gas flow away from the second turbine 125. In this manner, the rotating speed of the compressors 126, and thus the boost provided by the turbochargers 120, 124 to the engine 104 may be regulated during steady state conditions. Additionally, the first turbocharger 120 may also be provided with a turbine bypass valve. In other embodiments, only the first turbocharger 120 may be provided with a turbine bypass valve, or only the second turbocharger 124 may be provided with a turbine bypass valve. Additionally, the second turbocharger may be provided with a compressor bypass valve 129, which allows gas to bypass the second compressor 126 to avoid compressor surge, for example. In some embodiments, first turbocharger 120 may also be provided with a compressor bypass valve, while in other embodiments, only first turbocharger 120 may be provided with a compressor bypass valve.

According to embodiments disclosed herein, the first turbocharger and second turbocharger may be subject to differential air flow requirements during a response to a transient operating event, such as a decrease in engine load. Thus, the air flow through the first turbocharger and second turbocharger may be controlled differentially. For example, a turbine bypass valve of the second turbocharger may be adjusted to control the air flow through the second turbocharger, and if the first turbocharger is operating near a surge level, an exhaust gas recirculation valve may be adjusted to control air flow through the first turbocharger. The exhaust gas recirculation valve may be adjusted based on a trajectory of EGR amounts that track a surge level of the first turbocharger. Additional detail regarding controlling air flow through the turbochargers is presented below with respect to FIGS. 2-5.

The vehicle system 100 further includes an exhaust treatment system 130 coupled in the exhaust passage in order to reduce regulated emissions. As depicted in FIG. 1, the exhaust gas treatment system 130 is disposed downstream of the turbine 121 of the first (low pressure) turbocharger 120. In other embodiments, an exhaust gas treatment system may be additionally or alternatively disposed upstream of the first turbocharger 120. The exhaust gas treatment system 130 may include one or more components. For example, the exhaust gas treatment system 130 may include one or more of a diesel particulate filter (DPF), a diesel oxidation catalyst (DOC), a selective catalytic reduction (SCR) catalyst, a three-way catalyst, a $NO_x$ trap, and/or various other emission control devices or combinations thereof.

The vehicle system 100 may also include a self-load system that may include the engine 104, alternator/generator 140, resistive grids 142, and/or additional components. The self-load system may convert excess engine output to electricity via the alternator/generator 140, which may then be dissipated to one or more vehicle batteries or other energy storage devices, unloaded via the engine electrical system, and/or routed to the resistive grid 142, which dissipates the energy as heat. Thus, in the self-load mode, the engine is operated to generate excess torque and/or power beyond the traction motor demands by operating at a higher than necessary speed and load, with the excess energy being dissipated to the self-load system. For example, the self-load system operation may include dissipating excess electrical power generation through various devices, including the resistive grids 142 and/or to charge one or more of the batteries.

The vehicle system 100 further includes the control unit 180, which is provided and configured to control various components related to the vehicle system 100. In one example, the control unit 180 includes a computer control system. The control unit 180 further includes non-transitory, computer readable storage media (not shown) including code for enabling on-board monitoring and control of engine operation. The control unit 180, while overseeing control and management of the vehicle system 100, may be configured to receive signals from a variety of engine sensors, as further elaborated herein, in order to determine operating parameters and operating conditions, and correspondingly adjust various engine actuators to control operation of the vehicle system 100. For example, the control unit 180 may receive signals from various engine sensors including sensor 181 arranged in the inlet of the high-pressure turbine, sensor 182 arranged in the inlet of the low-pressure turbine, sensor 183 arranged in the inlet of the low-pressure compressor, and sensor 184 arranged in the inlet of the high-pressure compressor. The sensors arranged in the inlets of the turbochargers may detect air temperature and/or pressure. Additional sensors may include, but are not limited to, engine speed, engine load, boost pressure, ambient pressure, exhaust temperature, exhaust pressure, etc. Correspondingly, the control unit 180 may control the vehicle system 100 by sending commands to various components such as traction motors, alternator, cylinder valves, throttle, heat exchangers, wastegates or other valves or flow control elements, etc.

The system of FIG. 1 may provide for an engine system including a two-stage turbocharger, an EGR system configured to selectively route exhaust from a subset of cylinders of the engine to an intake of the engine via an EGR metering valve or to atmosphere via an EGR bypass valve, and a control unit configured to, during a first condition, adjust the EGR metering valve and EGR bypass valve to deliver a first amount of EGR based on a desired intake oxygen fraction, and during a second condition, adjust the EGR metering valve and EGR bypass valve to deliver a second amount of EGR to prevent surge of a low-pressure stage of the two-stage turbocharger.

The first condition may include steady state operating conditions, and the second condition may include a transient decrease in engine load. In other embodiments, the first condition may include mass air flow through a high-pressure stage of the two-stage turbocharger being above a threshold, and the second condition may include mass air flow through a high-pressure stage of the two-stage turbocharger being below the threshold. The threshold may be the mass air flow at the surge level for the low-pressure stage. The mass air flow through the high-pressure stage may a function of a desired high-pressure turbocharger speed and a desired cylinder pressure. The control unit may include further instructions to adjust a turbine bypass valve of the high-pressure stage to maintain mass air flow through the high-pressure stage below a maximum amount.

Figure 2:
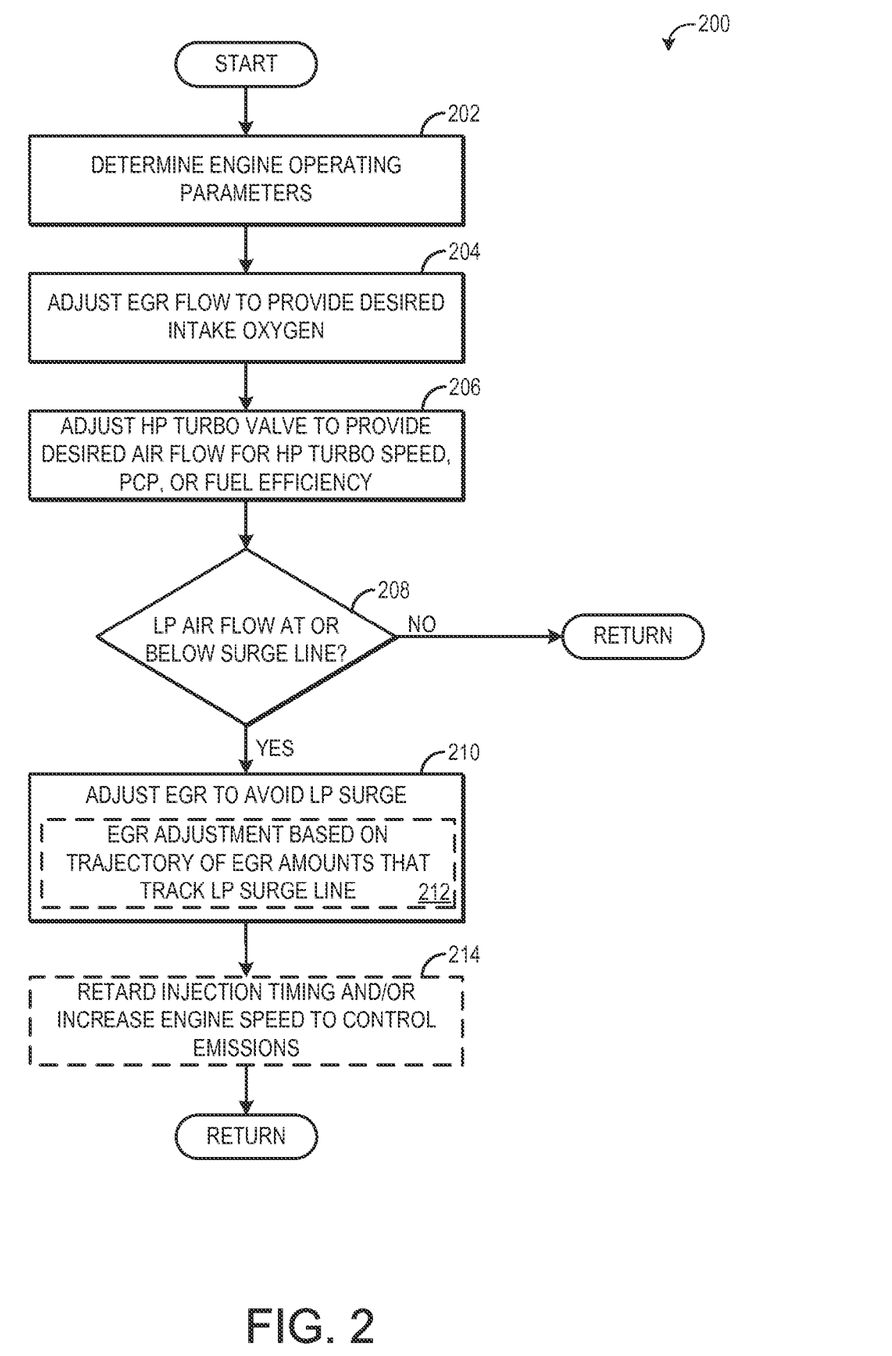
FIG. 2 is a flow chart illustrating a method for controlling air flow in a two-stage turbocharger according to an embodiment of the invention.

FIG. 2 is a flow chart illustrating a method 200 for controlling air flow through a two-stage turbocharger. Method 200 may be carried out by control unit 180 according to instructions stored thereon. The two-stage turbocharger may include two turbochargers arranged in series, such as turbocharger 120 and 124, wherein one turbocharger is a high-pressure turbocharger and one turbocharger is a low-pressure turbocharger. The two turbocharger stages may differentially respond to fluctuations in air flow, and as such may be regulated in different manners.

At 202, method 200 includes determining engine operating parameters. The determined engine operating parameters may include engine speed, load, fuel injection parameters, oxygen-fuel ratio (OFR), and other parameters. At 204, EGR flow is adjusted to provide desired intake oxygen. The desired intake oxygen may be provided in order to maintain NOx emissions below a desired amount. The desired intake oxygen may be based on engine speed and load, for example. Additionally, OFR may be adjusted to maintain particulate emissions below a desired amount, and if the OFR is increased to control particulate emissions, the amount of EGR provided to the intake may be increased as well. Thus, the amount of EGR to provide desired intake oxygen may be a function of engine speed, load, OFR, and/or other parameters.

At 206, a high-pressure turbocharger valve may be adjusted to provide desired air flow for maximum high-pressure turbocharger speed, peak combustion pressure (PCP), or fuel efficiency. The high-pressure turbocharger valve may be a turbine bypass valve (such as valve 128) and/or a high-pressure compressor bypass valve (such as valve 129). The high-pressure turbocharger valve may be adjusted to ensure excess air flow through the high-pressure turbocharger is avoided, particularly during a transient event, and to maintain operation of the high-pressure turbocharger at high efficiency. Additionally or alternatively, the high-pressure turbocharger valve may be adjusted to provide fresh air flow into the cylinders at an amount to maintain combustion pressure near peak combustion pressure. Additional detail regarding adjusting the turbocharger valve will be presented below with respect to FIG. 5.

At 208, it is determined if the air flow through the low-pressure turbocharger is at or below a surge level. The pressure ratio, mass air flow, and speed of the low-pressure turbocharger may be used to determine whether the low-pressure turbocharger is operating at or below the surge level. For example, the control unit may include a flow map that plots pressure ratio versus mass flow for a plurality of turbocharger speeds, and the control unit may determine the minimum air flow for avoiding surge from the flow map.

As explained above, the high-pressure and low-pressure turbochargers respond differently to similar air flow events. Therefore, while the high-pressure turbocharger valve is adjusted to maintain to the high-pressure turbocharger at a desired air flow amount for avoiding surge and choke, this adjustment may not result in a desired air flow through the low-pressure turbocharger to avoid surge or choke of the low-pressure turbocharger. In one example, if the high-pressure turbocharger valve is opened to provide the desired high-pressure turbocharger air flow, the low-pressure turbocharger may be pushed across its surge level.

Figure 3:
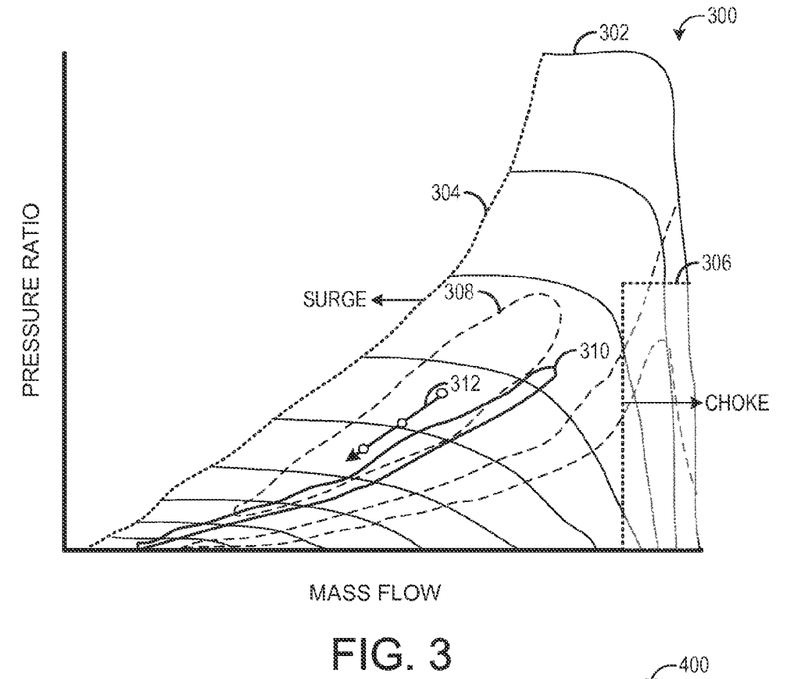
FIG. 3 is a turbocharger flow map for a high-pressure turbocharger according to an embodiment of the present invention.
Figure 4:
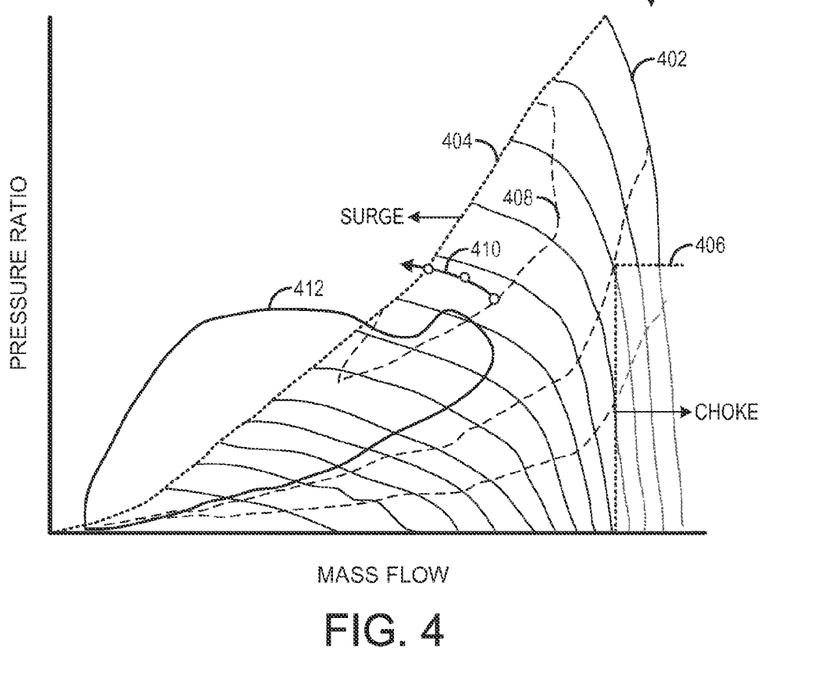
FIG. 4 is a turbocharger flow map for a low-pressure turbocharger according to an embodiment of the present invention.

FIGS. 3 and 4 are example turbocharger maps for a high-pressure and a low-pressure turbocharger that illustrate the differential response of the two turbochargers. FIG. 3 illustrates a map 300 for a high-pressure turbocharger, and FIG. 4 illustrates a map 400 for a low-pressure turbocharger. For both maps 300 and 400, the pressure ratio across the respective turbocharger is depicted on the vertical axis, while the mass flow through the respective turbocharger is depicted on the horizontal axis.

Referring now to FIG. 3, map 300 includes a plurality of turbocharger speed lines, for example speed line 302, which are illustrated in solid lines. For each respective speed line, optimal air flow for the turbocharger may be to the right of a surge level 304 and to the left of the choke region 306 (the boundary of which may be referred to as a choke level). Within the region of optimal air flow, there are zones of increasing efficiency illustrated by the dashed lines; zone 308 is an example of a highest efficiency zone. Thus, air flow through the high-pressure turbocharger may be controlled to maintain the turbocharger within the high-efficiency zone 308.

However, during a transient drop in engine load, the turbocharger may respond by operating within transient zone 310. As illustrated in FIG. 3, the transient zone 310 for the high-pressure turbocharger is within the boundaries of the surge level 304 and the choke region 306. Also illustrated in FIG. 3 is an example response to the high-pressure turbine bypass valve being opened. As the turbine bypass valve redirects air flow around the high-pressure turbocharger, the turbocharger responds with decreasing mass flow and a decreased pressure ratio, shown by line 312.

In contrast, the low-pressure turbocharger responds differently to a transient event than the high-pressure turbocharger. Map 400 of FIG. 4 includes a plurality of turbocharger speed lines 402, a surge level 404, and choke region 406, similar to the high-pressure map 300. Map 400 also includes zones of varying efficiency, such as high-efficiency zone 408. The efficiency zones of the low-pressure map as well as the surge level 404 are different in the low-pressure map as compared to the high-pressure map.

Furthermore, in response to a transient drop in engine load, the low-pressure turbocharger operates within transient zone 410, which as illustrated in FIG. 4 includes area to the left of the surge level 404. Furthermore, an example response to the turbine bypass valve of the high-pressure stage being opened is also illustrated in FIG. 4. Unlike the response illustrated by line 312 of FIG. 3, the low-pressure turbocharger is pushed towards the surge level as the turbine bypass valve of the high-pressure turbocharger is opened, as illustrated by line 412.

Thus, the low-pressure turbocharger may operate under surge conditions during a transient drop in load. Additionally, by opening the turbine bypass valve of the high-pressure turbocharger, the low-pressure turbocharger may be pushed to operate under surge conditions. Therefore, additional control mechanisms to avoid surge in the low-pressure turbocharger may be implemented in response to a decrease in engine load and/or in response to the turbine bypass valve of the high-pressure turbocharger being opened.

Returning to FIG. 2, if the air flow through the low-pressure turbocharger is not at or below the surge level, method 200 returns. However, if the air flow is at or below the surge level, method 200 proceeds to 210 to adjust the EGR amount provided to the intake to avoid turbocharger surge. For example, the EGR provided to the intake may be transiently decreased from a base EGR amount that provides desire intake oxygen in order to increase the air flow through the low-pressure turbocharger and push the low-pressure turbocharger back across the surge level. Adjusting the EGR amount may include, at 212, adjusting the EGR based on a trajectory of EGR amounts that track the surge level of low-pressure turbocharger. In one example, the trajectory may include a path through the compressor map defining a series of pressure ratio and flow ratio points, and the path may be parallel to the surge level. Thus, for given low-pressure turbocharger operating conditions (which may include mass air flow, pressure ratio, and/or turbocharger speed) there may be a predetermined amount of EGR that will maintain air flow through the low-pressure turbocharger above the surge level. In some embodiments, adjusting the EGR amount may include adjusting the position of the EGR valve 163, while in other embodiments it may include coordinately adjusting the position of an EGR metering valve 170 as well as an EGR bypass valve 164, as explained in more detail below with regard to FIG. 5.

If the EGR flow amount is reduced to avoid turbocharger surge, engine out emissions may increase. For example, a base EGR amount may be provided to the intake that decreases intake oxygen to a level that controls NOx emissions to a desired amount. By decreasing the EGR amount, intake oxygen and combustion temperature may increase, thus increasing NOx. To control emissions, method 200 may optionally include, at 214, retarding fuel injection timing and/or increasing engine speed. The fuel injection timing may be retarded by an amount that is proportional to the reduction in EGR. The engine speed may be increased without increasing vehicle speed by dissipating the excess engine output to the engine self-load system. By retarding fuel injection timing and/or increasing engine speed, emissions may be maintained at a desired amount when the EGR amount is reduced.

While method 200 of FIG. 2 illustrates an adjustment to the amount of EGR in response to a surge event of the low-pressure turbocharger, in some embodiments, the EGR may be adjusted even without detection of a surge event. For example, if a transient event is detected, such as a drop in engine load, the EGR amount may be adjusted proactively to prevent surge. Alternatively or additionally, the EGR may be adjusted when mass air flow through the high-pressure turbocharger is below a threshold or in response the turbine bypass valve of the high-pressure turbocharger being opened.

Figure 5:
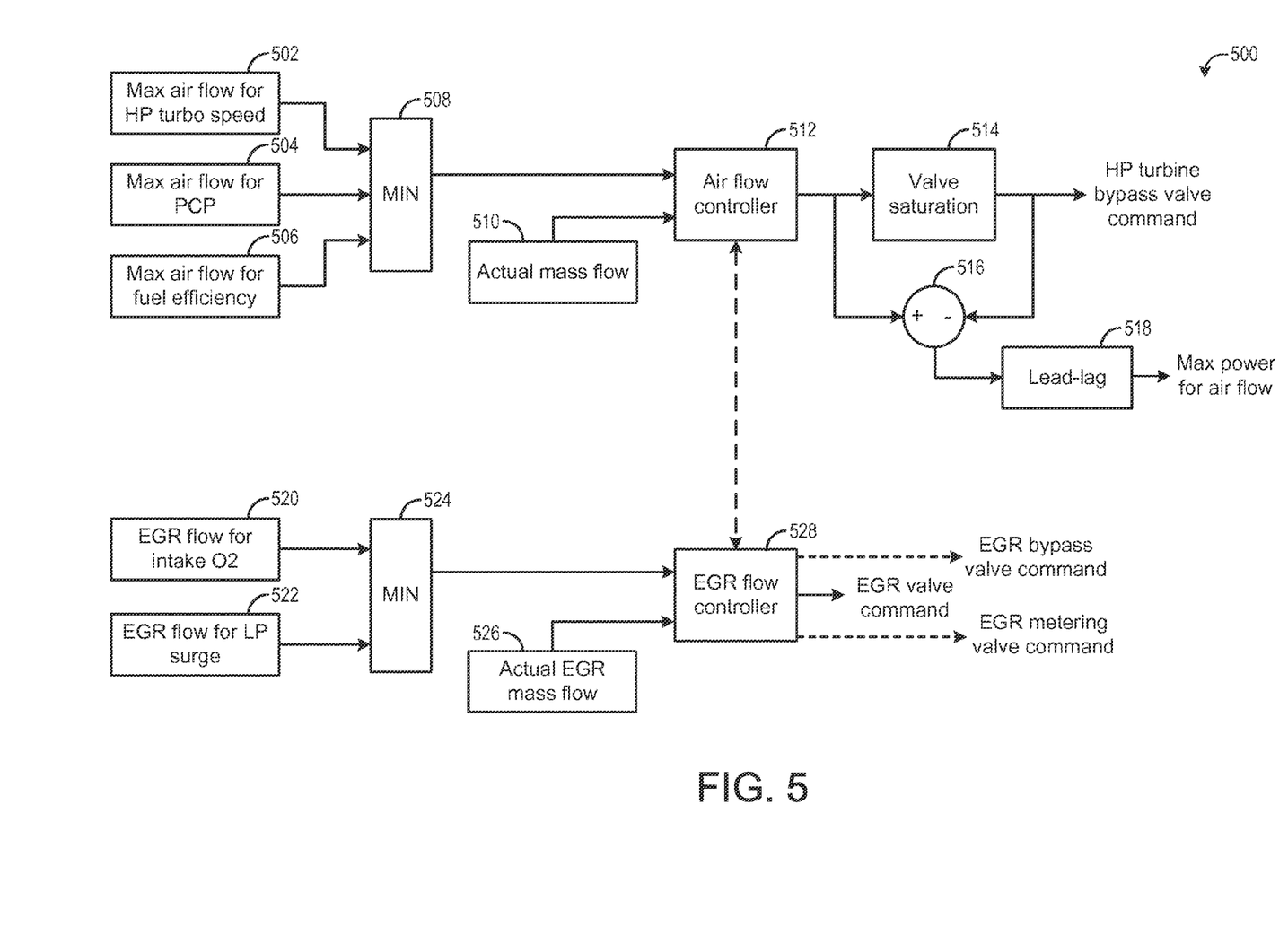
FIG. 5 is a diagram illustrating a control routine for determining turbine bypass valve and exhaust gas recirculation valve position according to an embodiment of the present invention.

FIG. 5 is a diagram illustrating an exemplary control routine 500 for adjusting turbine bypass valve and exhaust gas recirculation valve position. Routine 500 may be carried out by control unit 180 during the execution of method 200, for example. Routine 500 determines the position for a turbine bypass valve of a high-pressure turbocharger, such as valve 128. However, routine 500 may also be used to adjust a position of a compressor bypass valve of the high-pressure turbocharger, such as valve 129.

The position of the high-pressure turbine bypass valve may be adjusted to provide a desired air flow for one or more operating parameters. At 502, the maximum air flow for a desired high-pressure turbocharger speed is determined. The desired high-pressure turbocharger speed may be a maximum turbocharger speed, for example the speed line 302 illustrated in map 300. The mass air flow for the maximum speed is a function of the current pressure ratio, and may be selected from the turbocharger map. However, the mass air flow in the turbocharger map may represent a corrected mass air flow that takes into account the temperature and pressure of the air entering the turbocharger; thus the mass air flow selected from the map may be uncorrected in order to determine the actual allowable maximum air flow for the high-pressure turbocharger.

At 504, the maximum air flow for peak combustion pressure is determined. The maximum air flow for peak combustion pressure may be the air flow amount in the intake manifold that results in a cylinder air volume that provides for a designated maximum pressure in the cylinder during compression and resultant combustion. The peak combustion pressure is also a function of fuel injection parameters such as fuel rail pressure, injection timing, and intake oxygen, and may also be a function of the cylinder compression ratio, intake manifold temperature, and maximum intake manifold pressure.

At 506, the maximum air flow for best fuel efficiency is determined. Fuel efficiency may be a function of a number of engine operating parameters, including engine load, speed, etc., and it may also be affected by mass air flow. Thus, a maximum air flow for fuel efficiency may also be considered when determining the desired air flow.

At 508, the minimum air flow amount from the maximum air flow for maximum turbocharger speed, maximum air flow for peak combustion pressure, and maximum air flow for fuel efficiency is selected as the designated air flow amount. By choosing the minimum air flow amount from among the three different air flow amounts, it is ensured that none of the considered operating parameters are operating above a maximum allowed air flow amount.

The air flow amount output from 508 is input to an air flow controller 512 along with the actual measured mass air flow 510. The air flow controller may be included as part of control unit 180, and may be utilized specifically to determine a position for the turbine bypass valve. In one example, the position of the turbine bypass valve may be based on the difference between the desired air flow amount output from

508 and the current air flow amount at 510. Other mechanisms for determining the position of the turbine bypass valve are also possible, such as including feed-forward control.

The air flow controller 512 outputs a commanded valve position signal to a valve saturation regulator 514. Under certain conditions, the air flow controller 512 may output a valve position that is not attainable due to the physical constraints of the valve, e.g., the valve can only be adjusted between its fully open and fully closed positions, and cannot be adjusted outside of these positions. For example, if the valve is fully open yet the air flow controller 512 is commanding the valve be open more to reduce air flow through the turbocharger, the valve saturation regulator 514 will output the valve to remain in its fully open position. However, if the air flow controller 512 commands the valve to a position between fully open and fully closed, the valve saturation regulator 514 outputs the same signal as the controller.

If the valve is already at a fully open or fully closed position and yet additional air flow adjustments are indicated, the air flow cannot be further adjusted by the turbine bypass valve. To compensate, engine output may be adjusted. The difference between the valve position commanded before and after the valve saturation regulator 514 is determined at 516, and this difference is input to a lead-lag regulator 518. If the difference between the valve positions is different than zero, the lead-lag regulator 518 outputs a signal to adjust engine output, such as horsepower, torque, etc., to bring the air flow to the desired air flow.

Control routine 500 also determines the position an EGR valve, or in some embodiments, the position of an EGR metering valve and EGR bypass valve, which may be coordinately regulated to route a desired amount of exhaust from a subset of the cylinders (the donor cylinder group) to the intake and/or to the exhaust passage. To determine the EGR valve position, an EGR flow amount for designated intake oxygen is determined at 520. As explained previously, the EGR flow for designated intake oxygen may be determined based on engine speed, engine load, and OFR. Additionally, the EGR flow for designated intake oxygen may account for trapped in-cylinder oxygen amounts. The amount of oxygen trapped in the cylinders may be determined based on intake and exhaust valve timing, exhaust back pressure, and/or other parameters.

At 522, the maximum amount of EGR flow allowable without causing surge of the low-pressure turbocharger is determined. The maximum amount of EGR flow without surge is an amount of EGR that results in the minimum of amount of air flow for avoiding surge in the low-pressure turbocharger. The minimum air flow for avoiding surge is a function of the turbocharger speed. The minimum air flow amount may be determined based on a low-pressure turbocharger map, such as map 400. For example, the current turbocharger speed may be entered into the map and the air flow amount at or adjacent to the surge level for that speed determined. The turbocharger speed on the map may be a corrected turbocharger speed that takes into account the air temperature and pressure entering the turbocharger, and thus the minimum air flow selected from the map may be uncorrected in order to determine the actual minimum air flow amount. The maximum EGR amount may be determined by subtracting the minimum air flow amount from the current mass air flow.

In other embodiments, the EGR amount may be determined based on a stored trajectory of EGR amounts that are aligned substantially parallel with the surge level of the low-pressure turbocharger. For example, for a given turbocharger speed and/or pressure ratio, an EGR flow amount may be selected from the stored trajectory of EGR amounts. Each EGR amount from the stored trajectory may maintain the turbocharger outside the surge region.

At 524, the minimum EGR amount of the EGR for desired intake oxygen and the EGR for avoiding surge is selected as the desired EGR amount. By selecting the minimum EGR amount from between the EGR for intake oxygen and the EGR for avoiding surge, the EGR flow may be maintained below an amount that may cause surge in the low-pressure surge while providing desired emissions control under most conditions. The desired EGR flow amount selected at 524 is input into an EGR flow controller 528 along with an actual measured EGR flow amount 526. Similar to the air flow controller 512, the EGR flow controller 528 may be part of control unit 180, and may determine the position of the EGR valve or valves in order to provide the desired EGR amount. In one example, the actual EGR air flow may be subtracted from the desired EGR flow amount, and this difference, or error, between the actual and desired EGR amounts may be used by the EGR flow controller 528 to determine an adjustment to the EGR valve or valves.

Further, the EGR flow controller 528 may be in communication with the air flow controller 512. For example, the EGR flow controller 528 may receive the position of the turbine bypass valve from the air flow controller 512, and at least partially determine the position of the EGR valve based on the position of the turbine bypass valve. As explained earlier, as the turbine bypass valve opens, it may push the low-pressure turbocharger toward surge, and the EGR valve position may be further adjusted if the original EGR determination to avoid surge did not take the turbine bypass valve position into account.

The EGR flow controller 528 outputs a command for the position of the EGR valve. In other embodiments, the EGR flow controller 528 may output a command for the position of the EGR bypass valve, which regulates the exhaust that is routed to the exhaust passage and to atmosphere, and a command for the position of the EGR metering valve, which regulates the routing of the exhaust back to the intake. The coordinated control of the EGR bypass and metering valves provides a desired EGR amount for controlling emissions under most conditions (e.g., steady state conditions). However, if this amount of EGR would cause a reduction in air flow through the low-pressure turbocharger beyond the surge level, the EGR bypass and metering valves may instead be controlled to provide the desired amount of EGR for avoiding turbocharger surge.

Thus, method 200 of FIG. 2 and control routine 500 of FIG. 5 provide for an engine method comprising adjusting one or more exhaust gas recirculation valves to maintain a first turbocharger within a first air flow range, and adjusting a turbocharger bypass valve to maintain a second turbocharger within a second air flow range. The first air flow range may comprise a first mass air flow above a surge level and below a choke level for the first turbocharger, and the second air flow range may comprise a second mass air flow above a surge level and below a choke level for the second turbocharger. In embodiments, air flow through one of the turbochargers may be controlled to maintain the turbocharger within its air flow range, and the other turbocharger may be controlled relative to that turbocharger. In some embodiments, the first air flow range may comprise a first mass air flow above a surge level and below an air flow amount that provides maximum turbocharger speed for the first turbocharger, and the second air flow range may comprise a second mass air flow above a surge level and below an air flow amount that provided maximum turbocharger speed for the second turbocharger.

In embodiments, the first and second turbochargers have relative to each other at least one difference selected from: air output pressure, rotational speed, air mass throughput, surge threshold value, and stall state threshold value. The adjusting of the one or more exhaust gas recirculation valves may be based at least in part on the air output pressure, rotational speed, air mass throughput, surge threshold value, or stall state threshold value of the first turbocharger, the second turbocharger, or a combination of both the first and second turbocharger. The stall state threshold may be similar to the choke level described above.

In other embodiments, an engine method comprises adjusting an exhaust gas recirculation amount to provide a desired intake oxygen fraction, adjusting mass air flow through a high-pressure stage of a two-stage turbocharger to maintain the high-pressure stage below a maximum mass air flow, and in at least one mode of operation, reducing the exhaust gas recirculation amount to prevent a surge event of a low-pressure stage of the two-stage turbocharger. The exhaust gas recirculation amount may be transiently decreased in some embodiments.

The at least one mode of operation may comprise a decrease in engine load. Thus, the exhaust gas recirculation amount may be decreased responsive to the decrease in engine load. The high-pressure stage and the low-pressure stage may include different responses to the transient decrease in engine load, and the exhaust gas recirculation amount may be reduced to compensate for the different transient responses. In other embodiments, the at least one mode of operation may comprise air flow through the high-pressure stage being below a threshold. Thus, the exhaust gas recirculation amount may be decreased responsive to the air flow through the high-pressure stage being below the threshold. The threshold may be an air flow amount at a surge level for the low-pressure stage at a given pressure ratio and speed of the low-pressure stage, and therefore may be based on the pressure ratio and speed of the low-pressure turbocharger.

Another embodiment relates to an engine system. The system comprises an engine, a first turbocharger, a second turbocharger, and a control unit. The first turbocharger is coupled to an exhaust passage downstream of the engine, and the second turbocharger is coupled to the exhaust passage downstream of the first turbocharger. The system further comprises one or more exhaust gas recirculation valves, and a turbocharger bypass valve. The one or more exhaust gas recirculation valves are connected to an exhaust gas recirculation passage. The turbocharger bypass valve is connected to a turbine bypass passage coupled to the exhaust passage in one embodiment. The control unit is configured to adjust the one or more exhaust gas recirculation valves to maintain the first turbocharger within a first air flow range, and to adjust the turbocharger bypass valve to maintain the second turbocharger within a second air flow range.

Another embodiment relates to an engine system. The system comprises an engine, a control unit, and a two-stage turbocharger comprising a high-pressure stage (coupled downstream of an exhaust of the engine) and a low-pressure stage (coupled downstream of the high-pressure stage). The control unit is configured to adjust an exhaust gas recirculation amount to provide a designated intake oxygen fraction. To adjust the exhaust gas recirculation amount, the control unit may be configured to control an exhaust gas recirculation valve coupled to an exhaust gas recirculation passage. The control unit is further configured to adjust mass air flow through the high-pressure stage of the two-stage turbocharger to maintain the high-pressure stage below a maximum mass air flow. To adjust the mass air flow through the high-pressure stage, the control unit may be configured to control a turbocharger bypass valve (connected to a turbine bypass passage coupled to the exhaust passage in one embodiment). The control unit is further configured to operate, in at least one mode of operation, to reduce the exhaust gas recirculation amount to prevent a surge event of the low-pressure stage of the two-stage turbocharger.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
adjusting a turbocharger bypass valve to maintain a second turbocharger within a second air flow range;
adjusting a first exhaust gas recirculation valve and a second exhaust gas recirculation valve based on a designated intake oxygen amount, both exhaust gas recirculation valves further selectively adjusted based on the adjustment of the turbocharger bypass valve to decrease exhaust gas recirculation flow to an intake of an engine in order to maintain a first turbocharger within a first air flow range, different than the second air flow range; and
compensating for the decreased exhaust gas recirculation flow by adjusting one or more engine operating parameters.

2. The method of claim 1, wherein compensating for the decreased exhaust gas recirculation flow by adjusting one or more engine operating parameters comprises adjusting engine speed without increasing vehicle speed to maintain the first and second turbochargers within the first air flow range and the second air flow range, respectively, and wherein the first and second turbochargers are arranged in series.

3. The method of claim 1, further comprising adjusting the turbocharger bypass valve to maintain cylinder pressure below a peak combustion pressure.

4. The method of claim 1, wherein the turbocharger bypass valve comprises a turbine bypass valve of the second turbocharger, the turbine bypass valve coupled in a bypass line, the bypass line including an inlet coupled to an exhaust passage upstream of an inlet of a turbine of the second turbocharger and an outlet coupled to the exhaust passage downstream of an outlet of the turbine of the second turbocharger.

5. The method of claim 1, wherein the turbocharger bypass valve comprises a compressor bypass valve of the second turbocharger.

6. The method of claim 4, further comprising directing exhaust gas from the engine to the turbine of the second turbocharger, directing exhaust gas from the turbine of the second turbocharger to a turbine of the first turbocharger, and when the first exhaust gas recirculation valve is open, directing a portion of exhaust gas from upstream of the turbine of the second turbocharger back to the intake of the engine, where the outlet of the bypass line is coupled to the exhaust passage upstream of an inlet of the turbine of the first turbocharger.

7. The method of claim 1, wherein adjusting the first exhaust gas recirculation valve and the second exhaust gas recirculation valve based on a desired intake oxygen amount comprises:
   adjusting the first and second exhaust gas recirculation valves to respective base exhaust gas recirculation positions that provide the designated intake oxygen amount; and
   wherein both exhaust gas recirculation valves being further selectively adjusted based on the adjustment of the turbocharger bypass valve comprises, responsive to air flow through the first turbocharger being at or below a surge level, adjusting the first and second exhaust gas recirculation valves away from the respective base exhaust gas recirculation positions to maintain the first turbocharger within the first air flow range.

8. The method of claim 1, wherein the first air flow range comprises a first mass air flow above a surge level and below a choke level for the first turbocharger, and wherein the second air flow range comprises a second mass air flow above a surge level and below a choke level for the second turbocharger.

9. The method of claim 1, wherein the first and second turbochargers have relative to each other at least one difference selected from: air output pressure, rotational speed, air mass throughput, surge threshold value, and stall state threshold value; and, the adjusting of the first and second exhaust gas recirculation valves is based at least in part on the air output pressure, rotational speed, air mass throughput, surge threshold value, or stall state threshold value of the first turbocharger, the second turbocharger, or a combination of both the first and second turbochargers.

10. An engine method, comprising:
   adjusting an exhaust gas recirculation amount provided to an intake of an engine responsive to an actual exhaust gas recirculation amount deviating from a desired exhaust gas recirculation amount, the desired exhaust gas recirculation amount a function of a designated intake oxygen fraction;
   adjusting mass air flow through a high-pressure stage of a two-stage turbocharger to maintain the high-pressure stage below a maximum mass air flow; and
   responsive to operation at or below a surge level, instead of adjusting the exhaust gas recirculation amount responsive to the actual exhaust gas recirculation amount deviating from the desired exhaust gas recirculation amount, reducing the exhaust gas recirculation amount provided to the intake of the engine to prevent a surge event of a low-pressure stage of the two-stage turbocharger.

11. The method of claim 10, wherein adjusting the mass air flow through the high-pressure stage further comprises adjusting the mass air flow to maintain a designated peak combustion pressure.

12. The method of claim 10, wherein adjusting the mass air flow through the high-pressure stage further comprises adjusting a turbine bypass valve of the high-pressure stage.

13. The method of claim 10, wherein the exhaust gas recirculation amount is reduced to prevent the surge event responsive to a decrease in engine load.

14. The method of claim 13, wherein the high-pressure stage includes a different transient response to the decrease in engine load than a low-pressure stage transient response to the decrease in engine load, and further comprising, during the decrease in engine load, reducing the exhaust gas recirculation amount in order to compensate for the different transient responses.

15. The method of claim 10, wherein the exhaust gas recirculation amount is reduced to prevent the surge event responsive to the adjusting of the mass air flow through the high-pressure stage, the adjusting of the mass air flow through the high-pressure stage including moving a turbine bypass valve of the high-pressure stage into an open position.

16. The method of claim 10, wherein the exhaust gas recirculation amount is decreased based on a trajectory of exhaust gas recirculation amounts that track a surge level of the low-pressure stage, the trajectory including a path through a compressor map of the low-pressure stage defining a series of pressure ratio and mass flow points, the path parallel to the surge level.

17. The method of claim 10, further comprising, responsive to reducing the exhaust gas recirculation amount, retarding fuel injection timing by an amount proportional to the reduction of the exhaust gas recirculation amount.

18. The method of claim 10, further comprising, responsive to reducing the exhaust gas recirculation amount, increasing engine speed to generate excess torque beyond a traction demand and dissipating excess energy from the excess torque to a self-load system.

19. An engine system, comprising:
   an engine;
   a two-stage turbocharger system coupled to the engine and including a high-pressure stage and a low-pressure stage, airflow through the high-pressure stage controlled by a turbine bypass valve;
   an exhaust gas recirculation (EGR) system including an EGR metering valve and an EGR bypass valve, the EGR system configured to selectively route exhaust from a first subset of cylinders of the engine to an intake of the engine via the EGR metering valve or to atmosphere via the EGR bypass valve, the EGR bypass valve positioned upstream of the high-pressure stage; and
   a control unit storing instructions to:
      during a first condition, adjust the EGR metering valve and EGR bypass valve to deliver a first amount of EGR to the intake of the engine based on a desired intake oxygen fraction; and
      during a second condition and responsive to the first amount of EGR causing the low-pressure stage to operate at or below a surge level, adjust the EGR metering valve and EGR bypass valve to deliver a second amount of EGR to prevent surge of the low-pressure stage of the two-stage turbocharger system.

20. The engine system of claim 19, wherein the first condition comprises steady state operating conditions, and wherein the second condition comprises decreasing engine load, and wherein the EGR system is configured such that all exhaust gas from a second subset of cylinders of the engine is routed to atmosphere.

21. The engine system of claim 19, wherein the first condition comprises a mass air flow through the high-pressure stage of the two-stage turbocharger system being above a threshold, and wherein the second condition comprises the mass air flow through the high-pressure stage of the two-stage turbocharger system being below the threshold.

22. The engine system of claim 21, wherein the control unit includes further instructions to control the mass air flow through the high-pressure stage based on a designated high-pressure turbocharger speed and a designated cylinder pressure.

23. The engine system of claim 22, wherein the turbine bypass valve is coupled in a bypass line including an inlet coupled to an exhaust passage upstream of the high-pressure stage and an outlet coupled to the exhaust passage downstream of the high-pressure stage and upstream of the low-pressure stage, and wherein the control unit includes further instructions to adjust the turbine bypass valve of the high-pressure stage to maintain the mass air flow through the high-pressure stage below a designated maximum amount.

* * * * *